Sept. 25, 1962 P. E. FLOTRON 3,055,057
PROCESS FOR MANUFACTURE OF CORK BLOCK AND INSULATION
Filed June 29, 1959 5 Sheets-Sheet 1

INVENTOR
Paul E Flotron

BY Wenderoth, Lind & Ponack
ATTORNEYS

Sept. 25, 1962 P. E. FLOTRON 3,055,057
PROCESS FOR MANUFACTURE OF CORK BLOCK AND INSULATION
Filed June 29, 1959 5 Sheets-Sheet 2

INVENTOR
*Paul E Flotron*

BY Wenderoth, Lind & Ponack

ATTORNEYS

Sept. 25, 1962 P. E. FLOTRON 3,055,057
PROCESS FOR MANUFACTURE OF CORK BLOCK AND INSULATION
Filed June 29, 1959 5 Sheets-Sheet 3

INVENTOR
Paul E Flotron

BY Wenderoth, Lind & Ponack
ATTORNEYS

Sept. 25, 1962 P. E. FLOTRON 3,055,057
PROCESS FOR MANUFACTURE OF CORK BLOCK AND INSULATION
Filed June 29, 1959 5 Sheets-Sheet 4

INVENTOR
*Paul E Flotron*

BY *Wenderoth, Lind & Ponack*

ATTORNEYS

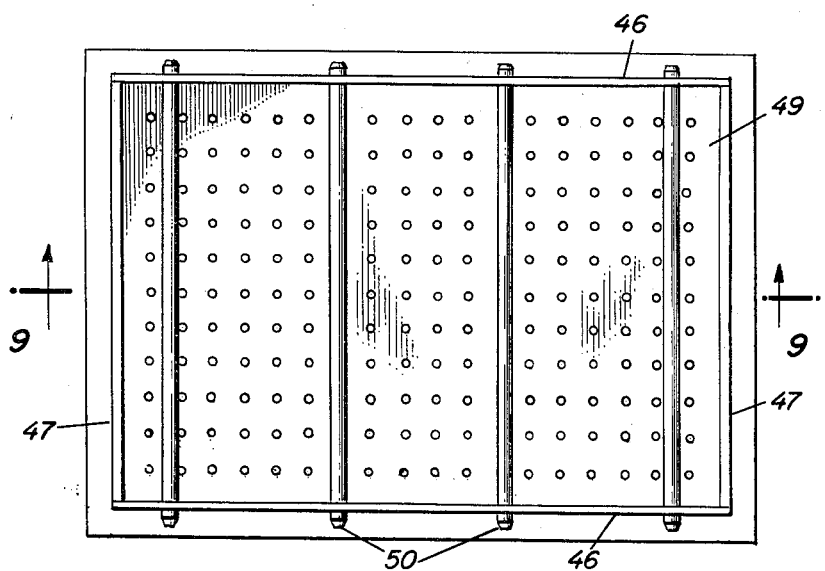
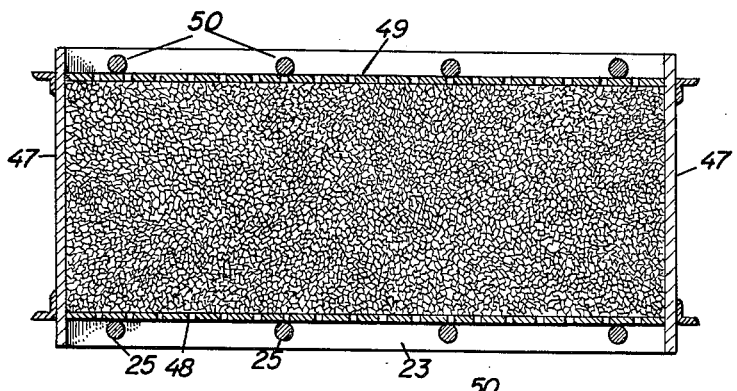
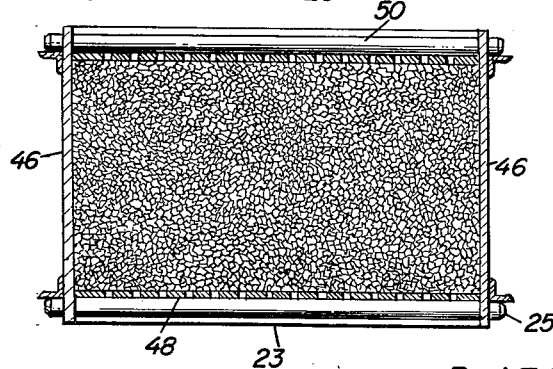

United States Patent Office 3,055,057
Patented Sept. 25, 1962

3,055,057
PROCESS FOR MANUFACTURE OF CORK BLOCK
AND INSULATION
Paul E. Flotron, Bethesda, Md., assignor, by mesne assignments, to Cork Products Research and Development Corporation, Alexandria, Va., a corporation of Virginia
Filed June 29, 1959, Ser. No. 823,591
5 Claims. (Cl. 18—48)

The present invention relates to the manufacture of cork bodies, such as blocks, sheets, plugs, discs, and other molded or shaped products, and constitutes an improved method for firmly uniting corking granules or particles of various sizes without the employment of an added adhesive, i.e. the cork particles are pressed together and are bonded by means of the natural adhesive gums present in the cork itself.

Cork products have become increasingly important in commerce, for such varied uses as insulation, friction materials, sealing gaskets, flooring, and many others. Because it is a product which is grown in nature and which thus far has only been successfully grown in the Mediterranean area, all of it that is used in the United States must be imported, and it is therefore important that maximum use be made of the raw cork.

The processes heretofore used for processing raw cork into cork blocks, plugs and other molded forms all basically comprise enclosing the particles to be molded in a mold and heavily compressing them therein. Thereafter superheated steam is passed through the thus compressed mass of cork particles for a relatively long period of time in order to heat the cork so that the natural gum adhesives contained in the cork are steamed out and disbursed throughout the mass between the cork particles therein. By careful control of the temperature, it is possible to keep the loss of the cork due to burning and charring to a minimum, but losses cannot be eliminated, and the lengthy application of steam to the cork mass causes exudation of the gums and resins from the mass to a much greater degree than can be utilized in adhering the particles together. Not only does this lead to loss of weight of the molded cork, but this excess of gums and resins must be disposed of, and because of its obnoxious nature, this presents a serious problem.

The present invention has as its object to provide a process which will overcome the deficiencies of the process heretofore used in the art.

It is a further object of the present invention to provide a process which produces a superior cork product to that produced by prior art processes.

It is a still further object of the present invention to provide a process for manufacture of molded cork bodies which can be practiced in an entirely enclosed container and will produce little or no waste products, all of the weight of the cork particles going into the molded cork body.

It is still another object of the invention to provide a process which can be carried out in a much shorter time than prior art processes and modifications thereof, thus permitting greater utilization of machinery and space, the process according to the invention not requiring that the raw cork particles be dried before they are molded, it being possible to carry out the process of the present invention both with and without addition of raw cork particles to the usual scrap or waste cork from industrial cork treating operations.

The cork mass of the molded bodies produced by the process according to the present invention, for example slabs suitable for use as insulation, is characterized by high tensile strength and flexibility, and throughout its thickness the particles which go to make up the mass of cork are uniformly adhered to each other in compacted relation. Furthermore, the product has a desirable color, it being possible to make it lighter in color than the molded product made by prior art processes, and it is free from charring and any semblance of powdering or flaking. Moreover, the natural properties of the cork, resilience, flexibility etc., are not substantially changed. In addition, the cork product has a density which is less than cork products heretofore produced, while the resistance to moisture absorption and adsorption, an important characteristic, is not in any way impaired.

Other objects and advantages of the present invention will become apparent from the following specification and claims, taken together with the accompanying drawings, in which:

FIG. 8 is a plan view of a mold used in the process according to the present invention;

FIG. 9 is a longitudinal sectional view of the mold of FIG. 8; and

FIG. 10 is a transverse sectional view of the mold of FIG. 8.

Figure 1:
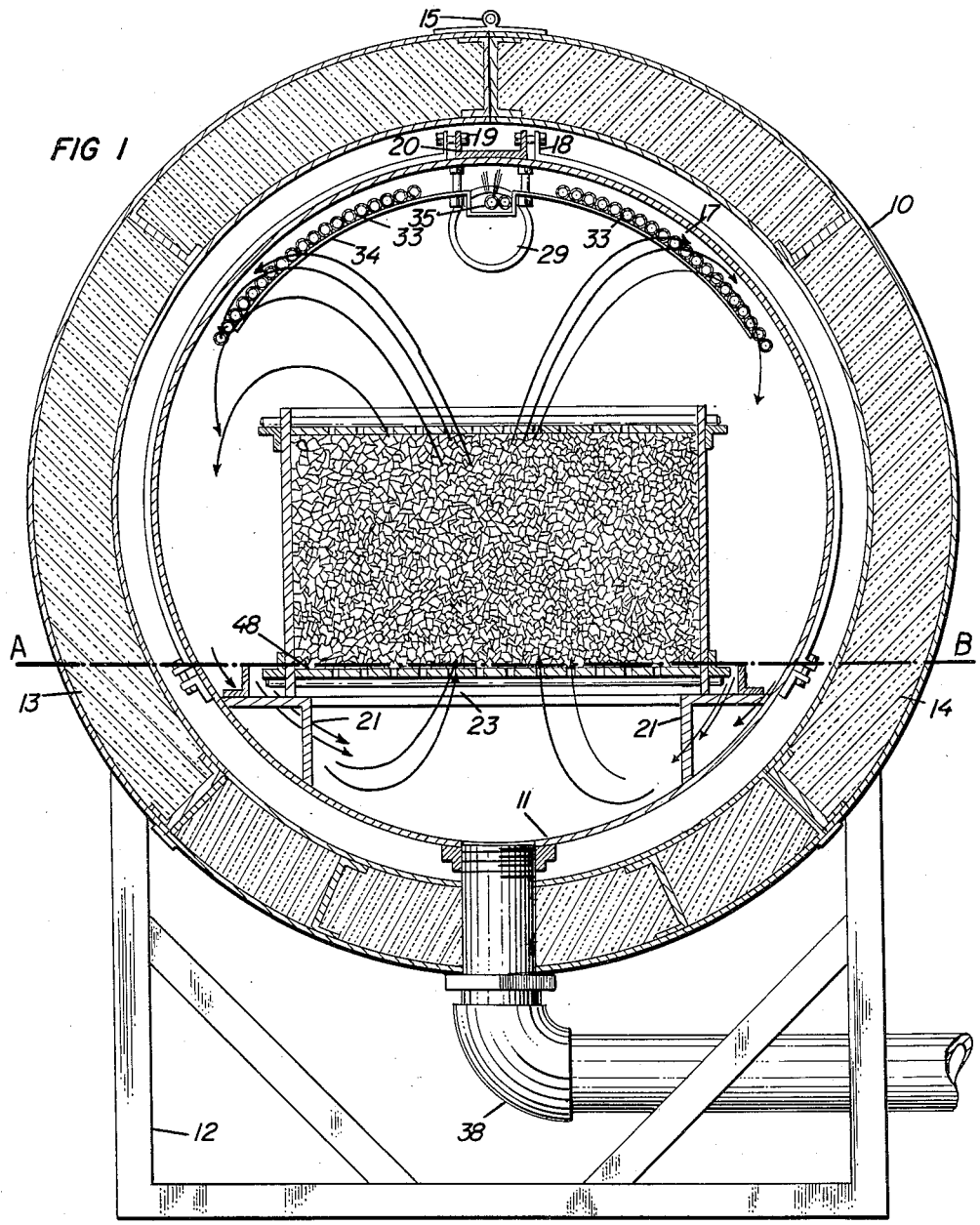
FIG. 1 is a transverse sectional view through an apparatus for carrying out the process according to the present invention.

The process according to the present invention generally comprises filling a space having the desired shape with uncompressed cork particles, tightly packing the cork particles or compressing them slightly, confining the cork particles to be molded within said space, first subjecting the thus confined cork particles to superheated steam at superatmospheric pressure for a short period of time, and then, while still maintaining the cork particles under the steam pressure, subjecting them to an inert gas at a superatmospheric pressure, and then suddenly releasing the pressure of the steam and the inert gas. In the production of commercially acceptable molded cork, the steam to which the confined cork particles are subjected may be between 290° F. to 510° F. and at a pressure of from 10 to 250 pounds per square inch gage. It may be supplied to the cork for a period of from 1 to 25 minutes. The inert gas is used at a pressure of from 250 to 900 pounds gage and at room temperature for a period of from 1 to 5 minutes. It has been found that the subjecting of the cork particles to the superheated steam causes the exudation of sufficient of the natural gum adhesives in the cork so that these may serve as adhesives to bind the cork particles together, and at the same time the high temperature and the dry condition of the superheated steam dries the cork particles, thus making a drying operation prior to the molding step unnecessary. At the same time the exposure to the high temperature steam is not for such a long period of time that the cork is burned or excess gum adhesive is steamed out. The addition of the high pressure inert gas forces the compressed steam and gas into the pores of the cork particles throughout the mass of the cork particles. The sudden release of the steam and the gas causes the expansion of the pores of the cork as a result of the expansion of the gas and steam within the pores, thus causing a swelling of the entire mass of cork particles. The swelling expands the mass of cork particles outwardly against the confinement thereof, and at the same time presses the particles against each other so that they are securely bound by the gum adhesives. In addition, the sudden expansion of the inert gas and the high pressure steam serves to substantially cool the mass of cork particles, thus making the cooling period after completion of the treating steps much shorter than in prior art processes.

Referring to the figures, one apparatus for carrying out the process according to the invention comprises an insulating casing 10 within which is disposed the heating chamber or shell 11, the casing 10 being supported if desired by a suitable frame 12. The insulating casing 10 is cylindrical and comprises a pair of shells within which is disposed a suitable insulating material such as magnesia, rock wool, asbestos, etc. For purposes of obtaining access to the interior of the casing, sections 13 and 14 of the insulating casing are hingedly connected together as shown at 15. The shell 11 is likewise of cylindrical form and is supported in spaced relation to the inner cylinder of the insulating casing by means of circular bands 16 welded to the shell 11, to the inner cylinder of the casing 10, or both. Extending substantially throughout the length of the chamber there may be provided, at the option of the maker, a series of electrical heating elements 17 provided at their ends with flanges 18. At their lower ends, the heating elements are bolted and held in position on the outside of the shell 11 through the medium of studs 19 engaging the flanges 18 and flanges 20 of suitable angle irons extending throughout the length of the shell 11 and welded to the outside thereof at spaced points as shown. The lower ends of the heating elements 17 are shown as terminating on a chordal line A—B adjacent the bottom of the shell 11 so that they do not entirely surround the shell. This is primarily a matter of convenience and ease of construction, since by terminating them at this point they do not interfere with the supporting members for the molds, to be described hereinafter. The upper ends of the heating elements are secured by means of their flanges 18 and studs 19 to the flanges 20 of the U-shaped channel member, which, as shown, likewise extends longitudinally of the shell 11 and is welded thereto.

Within the shell 11 at a point just below the chordal line of termination of the heating elements, are opposed longitudinally extending angle members 21, shown in FIG. 1 as having their longitudinally extending edges welded to the inner surface of the shell 11. Within the shell 11 and extending transversely across the ends thereof may be angle members 22 having one flange thereof welded to the end walls 24 of the shell 11. The flanges of the angle members 22 which project into the interior of the shell 11 are on a level with the horizontally positioned flanges of the angle members 21. All of the flanges are perforated as at 28a to permit passage of steam and gas therethrough.

End walls 24 closing each end of the shell 11 are welded to the shell 11. The front plate has an opening 24' therein cooperating with a door 41 covering an opening 40 in the end of casing 10, the opening 24' serving to permit a mold to be placed in and removed from the heating chamber.

Figure 2:
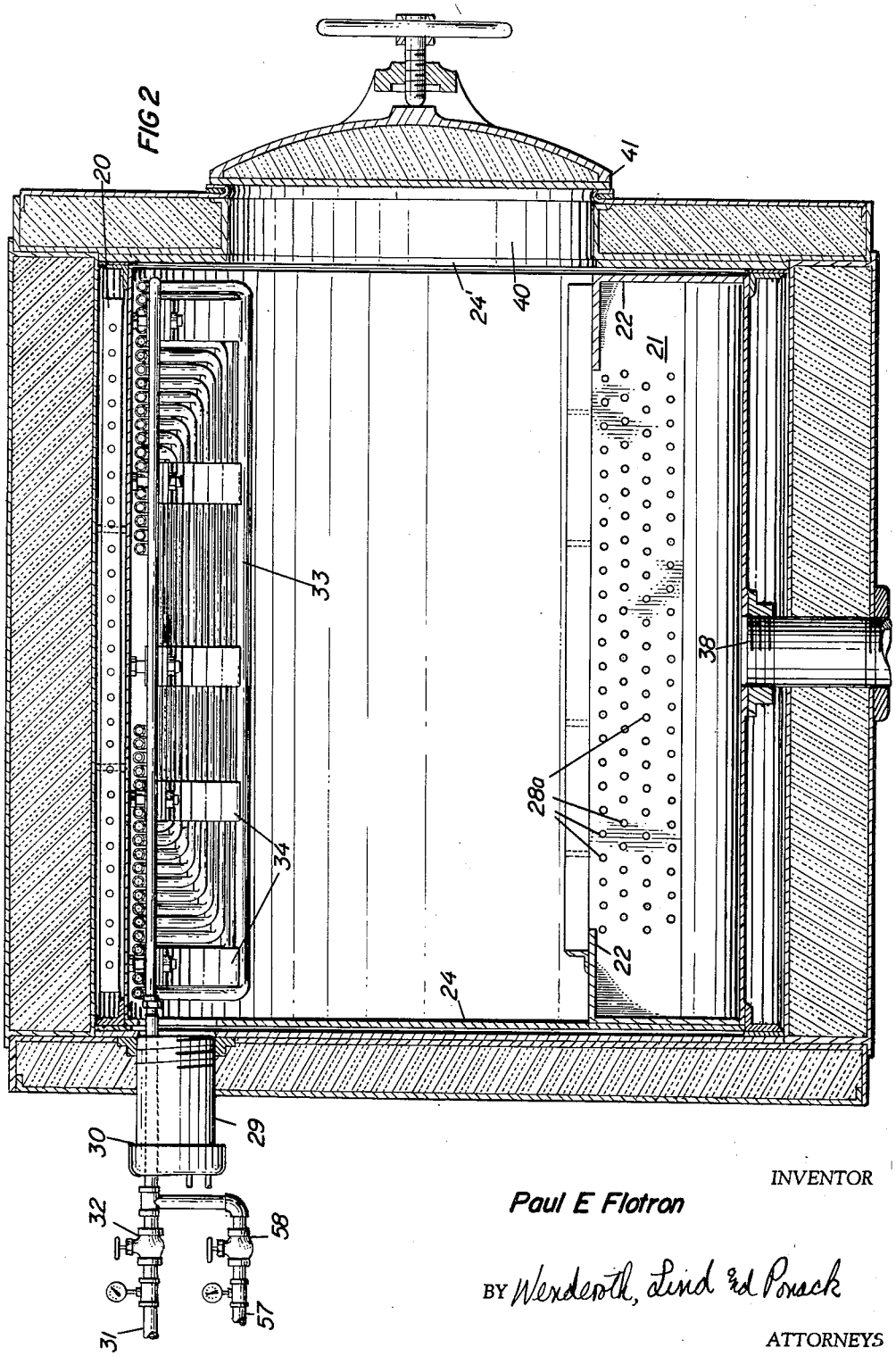
FIG. 2 is a vertical longitudinal section through the apparatus of FIG. 1.

As shown in FIG. 2, there is supported in one end of the casing 10 near the top thereof a barrel 29 opening at one end into the shell 11 and at its outer end carrying a header 30 having a plurality of openings therein for supporting various instruments by which the process and apparatus are controlled. Also carried by this header is a supply line 31 having a valve 32 therein, the line entering the upper portion of the shell 11. A branch line 57 is connected to the supply line 31, and has a valve 58 therein.

Figure 6:
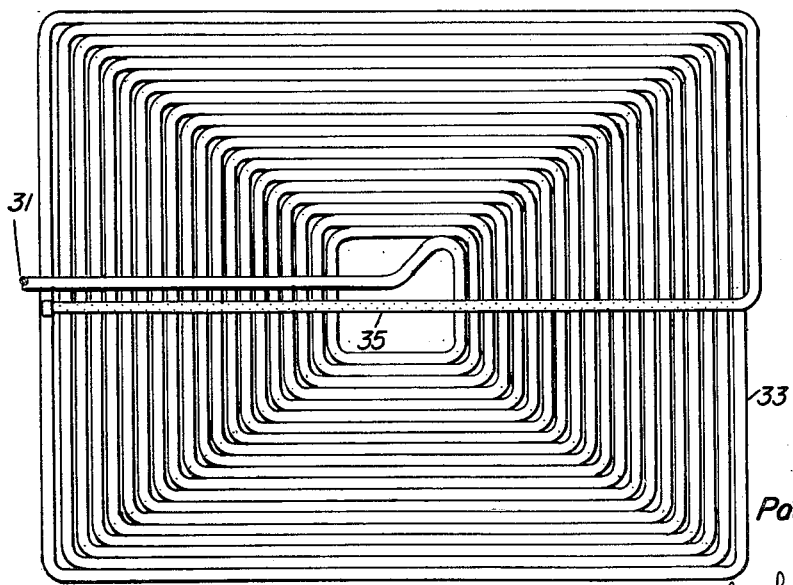
FIG. 6 is an elevation view of a coil for adding heat to the steam in the apparatus.

The supply line 31 may connect to a coil 33 which may also, at the option of the maker, be provided within the shell 11. The coil 33, as shown in FIGS. 1 and 6 is supported throughout the length of the shell by means of a plurality of brackets 34 carried by studs fixed to the inner wall of the shell 11, and the coil terminates in a perforated outlet pipe 35 which is closed at its end. The openings in the pipe 35 direct steam upwardly against the wall of the shell in such a manner that motion or eddy currents of the fluid in the shell are promoted. The purpose of the coil 33 is to permit superheating of the steam passing therethrough by the addition of heat from the heating elements 17. Consequently if there is a source of steam which is already superheated to the required degree readily available, the heating elements 17 and the coil 33 are not necessary, and the perforated outlet pipe 35 may be attached directly to the supply pipe 31.

Figures 3, 4:
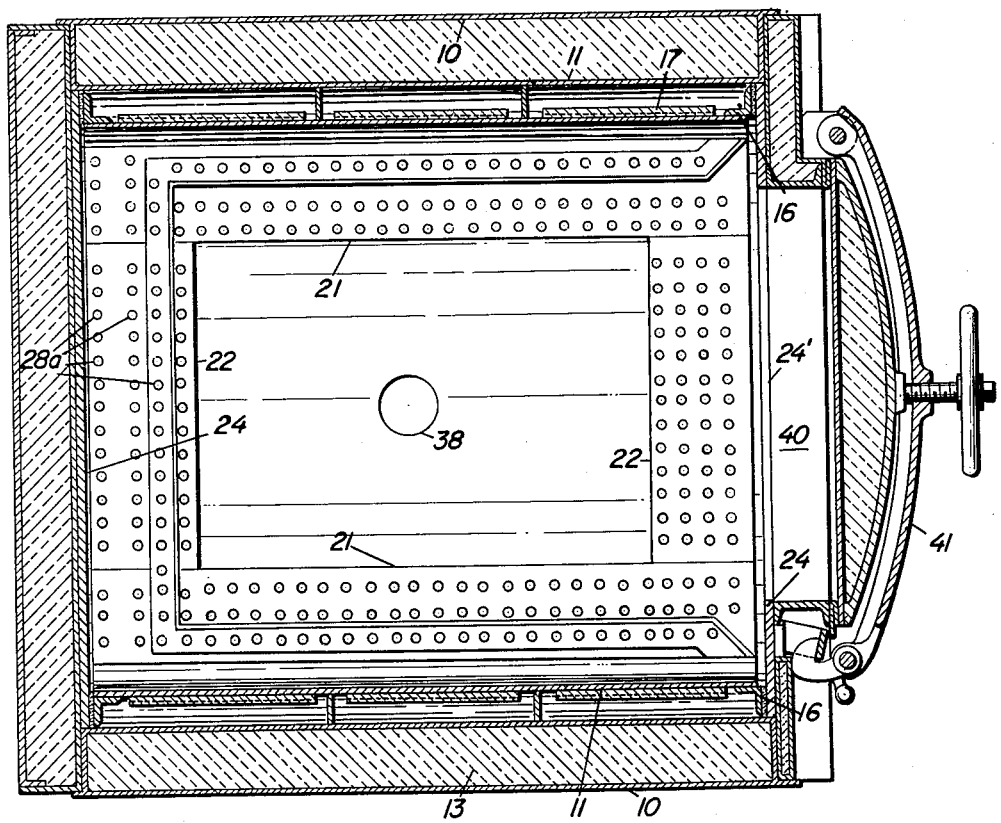
FIG. 3 is a horizontal longitudinal section through the apparatus of FIG. 1.
FIG. 4 is a diagrammatic view of the apparatus of FIG. 1, showing some of the control means therefor.
Figure 5:
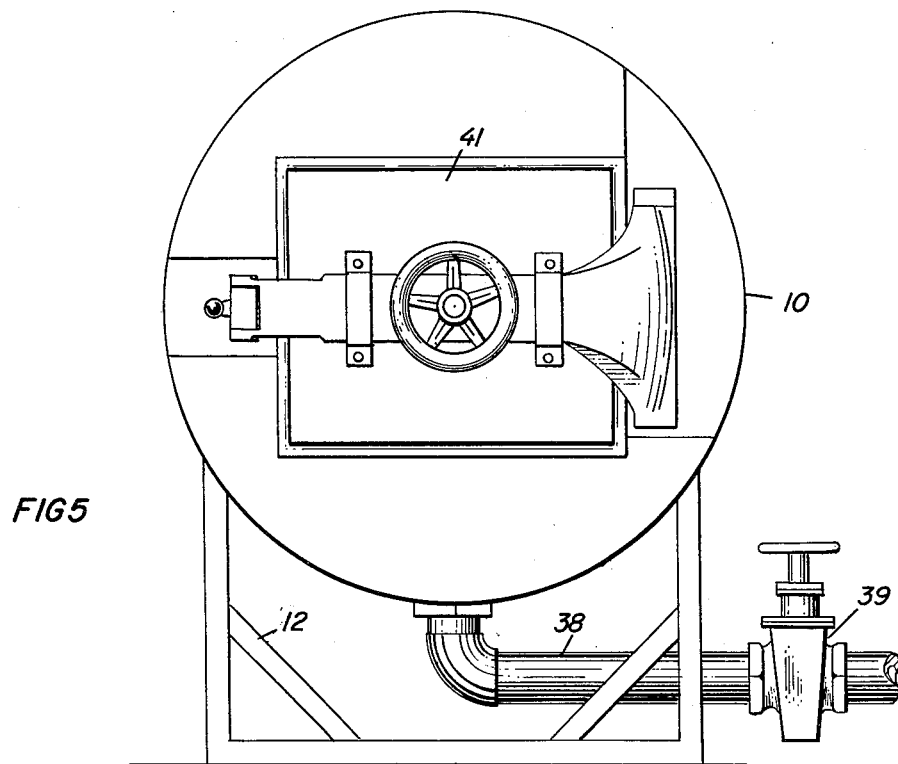
FIG. 5 is a front elevation view of the apparatus of FIG. 1.
Figure 7:
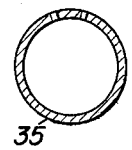
FIG. 7 is a sectional view along line 7—7 of FIG. 6.

The controls which are carried in the header 30 are shown diagrammatically in FIG. 4, and comprise generally a pressure gage 52 in the form of a mercury column gage for showing the internal pressure in the shell 11, a safety valve 53, and a thermometer 54 for showing the temperature in the shell 11. At 51 is shown a pressure gage for the supply line, and at 59 is shown a pressure gage for the branch line 57. A pyrometer 55 may be provided for showing the temperature of the heating elements, and a thermostatic control means 56 may be connected with the electric heating means and associated with the shell for controlling and maintaining the required internal temperature when the steam is required to be superheated by the use of the electric heating means.

At the bottom of the shell 11 is an outlet 38 whereby gasses can be removed from the shell. A suitable control valve 39 is provided in the outlet 38.

Shown in FIGS. 8, 9 and 10 is a mold suitable for use in the apparatus of the preceding figures. The mold is substantially rectangular and has side walls 46 and end walls 47. A perforated bottom plate 48 is fitted into the bottom of the mold, and a flange 23 depends from the bottom edges of the side walls 46 and the end walls 47. Extending across the bottom plate 48 are a plurality of supporting rods 25 which are held in place by passing through the flange 23. A removable perforated top plate 49 fits over the top of the side and end walls, and is held in place by a plurality of holding rods 50 which pass through the side walls 46.

The manner in which the process is carried out by using the apparatus will now be described.

Insulation cork board is made by first taking undried natural cork particles with a desired screen size and weight and placing them in a mold such as is shown in FIGS. 8–10. A mold, which when it is used to produce a commercial size block for cutting up into sheets may be 20" high and have a width of 25" and length of 37" is filled to the desired amount and the perforated top plate 49 is placed over the cork in the mold. The perforated top plate may be left in this position or moved downwardly to compress the cork, if desired and the holding rods 50 are placed in position. The mold is then placed in the shell 11 through the door 41, where it rests on the angle members 21. The shell 11 is then closed, the valve 39 in the outlet 38 is completely closed, and then the valve 32 is opened to admit superheated steam to the shell 11. If a source of steam at the desired temperature and pressure is not available, steam at a lower degree of superheat can be admitted to the coil 33, and the temperature and pressure raised by use of the heating elements 17. This steam pressure and temperature are held for the desired period, after which the valve 58 is opened and $CO_2$ or another inert gas at the desired pressure is admitted. This pressure is held for the desired length of time, at which time the valves 32 and 58 are closed, and the valve 39 in the outlet 38 is opened suddenly. The mold is then removed from the shell 11, and the already partly cooled block of molded cork particles is permitted to cool further for a short period of time. It is then cut into boards or sheets.

In the treatment of the cork to make cork board, the mold may be filled to a depth of from 12 to 16½ inches with cork particles of from ⅛ to ⅝" screen size, and the top pressed down until the mass is from 12" to 13" thick. The steam is supplied at a temperature of from 290° F.

to 510° F. and at a pressure of from 10 to 250 pounds per square inch age. The cork may be subjected to the steam for a period of from 6 to 25 minutes. Carbon dioxide, or another inert gas, may be supplied at a pressure of from 250 to 900 pounds per square inch gage for a period of from 2 to 5 minutes. Alternatively, granulated cork particles with the desired screen size and weight may be packed tightly in a cylindrical mold, which for commercial size plugs may be 1″ in diameter and 3″ long and steam at the desired temperature and pressure is applied for the desired time and $CO_2$ or another inert gas at the desired pressure is applied, in addition to the steam, for the desired time. There is produced a cork plug having a low density and all of the desirable properties necessary for sealing disks, etc. which may be produced from such plugs.

When such plugs are to be produced, steam is supplied at a temperature of from 360° F. to 420° F. and at a pressure of from 40 to 80 pounds per square inch gage. The cork particles are subjected to this steam for a period of from 1 to 2 minutes. The carbon dioxide, or other inert gas, is supplied at a pressure of from 300 to 900 pounds per square inch gage for a period of from 1 to 4 minutes.

The following table sets forth a series of specific examples, and gives the size of the cork particles and their weight as well as the conditions and lengths of time for which the steps of the treatment are carried out. Examples I through VII are for cork blocks of commercial size, 25″ x 37″ and with a thickness as given in the "Compression To" column. The loose cork particles in the mold are compressed from the thickness given in the "Compression From" column to the thickness given in the "Compression To" column. Examples VIII through XII are for cork plugs of commercial size, 1″ in diameter and 3″ long.

ment time cools the block of molded cork considerably, even before the mold is removed from the shell where the cork has been exposed to the steam and the gas. This makes possible a vastly increased output from each piece of apparatus, thus making possible either a smaller investment in equipment and space for a manufacturing operation, or a large increase in output from presently existing installations.

Of perhaps equal importance to the time saving is the increased use which is made of the raw material, i.e. cork particles. With the present method, there is no waste of the cork, no losses due to the relatively long steaming times heretofore used. Consequently, maximum use is made of the raw cork and waste cork from other cork operations. This further increases the economy of operation which is made possible by means of the present method.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

I claim:

1. A process of treating cork to produce a molded cork body, comprising filling a space having the desired shape with cork particles to be molded into the molded cork body, confining the cork particles to be molded within said space, first subjecting the thus confined cork particles to superheated steam at superatmospheric pressure for a period of time sufficient to cause exudation of sufficient of the natural gum adhesives present in the cork to bind all of the cork particles together, then, while

| Ex. | Cork | | Compression | | Steam | | | $CO_2$ | | Finished cork, lbs./bd. ft. |
|---|---|---|---|---|---|---|---|---|---|---|
| | Particle screen size, inches | Weight, lbs./cu. ft. | From, inches | To, inches | Temp. °F. | Pressure, lbs./sq. in. | Time, min. | Pressure, lbs./sq. in. gage | Time, min. | |
| I | ⅛–⅝ | 6 | 12 | 12 | 501 | 250 | 6 | 900 | 4 | 0.5 |
| II | ⅛–⅝ | 9.6 | 16½ | 13 | 483.9 | 210 | 8 | 800 | 2 | 0.8 |
| III | ⅛–⅝ | 8.4 | 15½ | 13 | 477 | 190 | 8 | 500 | 2 | 0.7 |
| IV | ⅛–⅝ | 6 | 12½ | 12½ | 468 | 170 | 8 | 350 | 2 | 0.5 |
| V | ⅛–⅝ | 8.4 | 15½ | 13 | 441 | 120 | 12 | 340 | 2 | 0.7 |
| VI | ⅛–⅝ | 8.4 | 15½ | 13 | 328 | 20 | 16 | 400 | 3 | 0.7 |
| VII | ⅛–⅝ | 8.4 | 15½ | 13 | 298 | 10 | 25 | 250 | 5 | 0.7 |
| VIII | 1/16 | 7 | Packed tightly in the mold | | 412 | 80 | 2 | 550 | 2 | 0.5 |
| IX | 1/16 | 7 | | | 381 | 55 | 1½ | 370 | 1½ | 0.5 |
| X | 1/16–⅛ | 7 | | | 381 | 50 | 1 | 300 | 1½ | 0.5 |
| XI | 1/16 | 7 | | | 381 | 50 | 1 | 660 | 1 | 0.5 |
| XII | 1/16 | 7 | | | 367 | 40 | 2 | 900 | 4 | 0.5 |

It will thus be seen that by a careful selection of the weight and size of the cork particles from which the molded cork is made, and by the proper selection of the steam temperature and pressure and the pressure of the inert gas and the times for which the steam alone and the steam and inert gas together are applied to the cork particles, there can be produced a variety of expanded molded cork articles with the desired density. The size and shape of the finished product is of course governed by the size and shape of the mold used, the mold being filled with the loose untreated cork particles whatever its size. Since the steam temperature and the time the cork particles are exposed to it do not burn the cork, there is no odor or taste imparted to the cork, taste being important where the cork is to be used to line bottlecaps. More important, however, is the fact that the time necessary to carry out the process is far less than has heretofore been necessary, both because the time that the cork is actually being treated by the steam and the inert gas is less than the time heretofore used for treatment with steam alone, and beccause the sudden expansion of the steam and the gas at the end of the treatstill maintaining the cork particles under the steam pressure, adding to the steam an inert gas at a superatmospheric pressure and room temperature and maintaining the cork particles under the effect of the steam and inert gas for a period of time sufficient to expand the cork particles, and then suddenly releasing the pressure of the steam and the inert gas from at least a substantial portion of the surface of the mass of cork particles.

2. A process of treating cork to produce a molded cork body, comprising filling a space having the desired shape with cork particles to be molded into the molded cork body, confining the cork particles to be molded within said space, first subjecting the thus confined cork particles to superheated steam at a temperature above 290° F. and a pressure of above 10 pounds per square inch gage for a period of not longer than 25 minutes, then, while still maintaining the cork particles under the steam pressure, adding to the steam an inert gas at a pressure greater than 250 pounds per square inch gage and at room temperature and maintaining the particles under the effect of the steam and inert gas for a period of longer than one minute, and then suddenly releasing the pressure of the steam and the inert gas from at least a substantial portion of the surface of the mass of cork particles.

3. A process of treating cork to produce a molded cork body, comprising filling a space having the desired shape with cork particles to be molded into the molded cork body, confining the cork particles to be molded within said space, first subjecting the thus confined cork particles to superheated steam at a temperature of from 290° F. to 510 F. and a pressure of from 10 to 250 pounds per square inch gage for a period of from 1 to 25 minutes, then, while still maintaining the cork particles under the steam pressure, adding to the steam an inert gas at a pressure of from 250 to 900 pounds per square inch gage and at room temeprature and maintaining the particles under the effect of the steam and inert gas for a period of from 1 to 5 minutes, and then suddenly releasing the pressure of the steam and the inert gas from at least a substantial portion of the surface of the mass of cork particles.

4. A process of treating cork to produce a molded cork body, comprising filling a space 25 by 37 inches to a depth of from 12 to 16½ inches with cork particles of from ⅛ to ⅝ inch screen size, compressing the mass of cork particles to a thickness of from 12 to 13 inches, confining the thus compressed cork particles, first subjecting the thus confined cork particles to superheated steam at a temperature of from 290° F. to 510° F. and a pressure of from 10 to 250 pounds per square inch gage for a period of from 6 to 25 minutes, then, while still maintaining the cork particles under the steam pressure, subjecting them to an inert gas at a pressure of from 250 to 900 pounds per square inch gage for a period of from 2 to 5 minutes, and then suddenly releasing the pressure of the steam and the inert gas from at least a substantial portion of the surface of the mass of cork particles.

5. A process of treating cork to produce a molded cork body, comprising tightly packing a cylindrical space 1 inch in diameter and 3 inches long with cork particles of from 1/16 to ⅛ inch screen size, confining the cork particles to said space, first subjecting the thus confined cork particles to superheated steam at a temperature of from 360° F. to 420° F. and a pressure of from 40 to 80 pounds per square inch gage for a period of from 1 to 2 minutes, then, while still maintaining the cork particles under the steam pressure, subjecting them to an inert gas at a pressure of from 300 to 900 pounds per square inch gage for a period of from 1 to 4 minutes, and then suddenly releasing the pressure of the steam and the inert gas from at least a substantial portion of the surface of the mass of cork particles.

References Cited in the file of this patent

UNITED STATES PATENTS

| 1,184,307 | Bentley | May 23, 1916 |
| 1,380,426 | Seward | June 7, 1921 |
| 1,790,011 | Marquette | Jan. 27, 1931 |
| 1,808,428 | Minor | June 2, 1931 |
| 2,347,320 | Hiltner | Apr. 25, 1944 |

FOREIGN PATENTS

| 345,335 | Great Britain | Mar. 19, 1931 |